United States Patent [19]

Chan et al.

[11] Patent Number: 4,616,056

[45] Date of Patent: Oct. 7, 1986

[54] POLY(ARYL ETHER KETONES) CONTAINING SULFUR

[75] Inventors: Chi M. Chan, Palo Alto; Adam C. Tanous, San Francisco, both of Calif.

[73] Assignee: Raychem Corporation, Menlo Park, Calif.

[21] Appl. No.: 735,881

[22] Filed: May 16, 1985

[51] Int. Cl.[4] .................... C08L 61/16; C08L 71/00
[52] U.S. Cl. .................... 524/392; 524/170; 524/418; 528/125; 528/126; 528/128
[58] Field of Search .................. 524/392, 418, 170; 528/125, 126, 128

[56] References Cited

U.S. PATENT DOCUMENTS

| | | | |
|---|---|---|---|
| 3,386,950 | 6/1968 | Horvath et al. | 524/392 |
| 3,542,726 | 11/1970 | Stewart | 524/392 |
| 3,993,628 | 11/1976 | Jarrett et al. | 528/125 |
| 4,268,650 | 5/1981 | Rose | 528/125 |
| 4,419,486 | 12/1983 | Rose | 528/125 |

*Primary Examiner*—Lester L. Lee
*Attorney, Agent, or Firm*—Edith A. Rice; Herbert G. Burkard

[57] ABSTRACT

Compositions comprising a poly(aryl ether ketone) having intimately dispersed therein, from about 0.1 to 5% sulfur, by weight, based on the weight of poly(aryl ether ketone), the sulfur present as at least one member of the class consisting of elemental sulfur, aliphatic and aromatic dithiols, polysulfides of the formula —R—S—S— where R is a bivalent aliphatic or aromatic radical, and inorganic sulphides are useful because of their high tensile modulus, high-temperature adhesive properties, and dimensional stability. In a further embodiment the composition further contains a reinforcing filler such as glass or carbon fibers. In further embodiments the composition may be made into fibers or used as adhesives.

14 Claims, 6 Drawing Figures

FIG_1

FIG_2

FIG_3

FIG_4

FIG_5

FIG_6

POLY(ARYL ETHER KETONES) CONTAINING SULFUR

BACKGROUND OF THE INVENTION (a) Field of the Invention

This invention relates to polymers with improved performance characteristics. In particular the invention relates to compositions comprising a poly(aryl ether ketone) having intimately dispersed therein from about 0.1 to 5% sulfur, by weight, based on the weight of poly(aryl ether ketone).

(b) Background Information

Poly(aryl ether ketones) are known in the art and are tough, rigid, high-performance thermoplastics which have excellent mechanical and electrical properties. Articles formed from them maintain their properties over a wide temperature range and can be used continuously at high temperatures.

In U.S. Pat. No. 3,993,628 to Jarrett et al it is disclosed that mixtures of an aromatic copolyetherketone/sulfone, containing 3 to 9 ketones links per sulfone linkage, with sulfur or a sulfur compound exhibit an increase in molecular weight and the polymer crosslinked upon heating. It is reported that the corresponding polyetherketones, i.e. without any sulfone links, do not exhibit an increase in molecular weight upon heating. It is further reported that when a polyetherketone was and 1% elemental sulfur were powder blended and then compression molded at 400° C. for 15 minutes, the polyetherketone was found to have decomposed without forming of a coherent film.

We have now discovered that if sulfur or a sulfur compound as hereinafter defined is uniformly dispersed in a polyarylether ketone the properties of the polymer are significantly and surprisingly improved. In particular we have found that a poly(aryl ether ketone) having uniformly dispersed therein sulfur or a sulfur compound exhibit improved tensile modulus, creep resistance and in particular their adhesive properties, especially at high temperatures.

SUMMARY OF THE INVENTION

The invention comprises compositions comprising a poly(aryl ether ketone) having intimately dispersed therein from about 0.1 to about 5% sulfur, by weight, based on the weight of the poly(aryl ether ketone), the sulfur present as at least one member of the class consisting of elemental sulfur, aliphatic and aromatic dithiols, polysulfides of the formula —R—S—S— where R is a bivalent aliphatic or aromatic radical and inorganic sulphides. These compositions are useful for their high tensile modulus, their high-temperature adhesive properties, and their dimensional stability. The invention further relates to a composition comprising a) a poly(aryl ether ketone) having intimately dispersed therein from about 0.1% to 5% sulfur, by weight, based on the weight of the poly(aryl ether ketone), the sulfur present as at least one member of the class consisting of elemental sulfur, aliphatic and aromatic dithiols, polysulfides of the formula —R—S—S— where R is a bivalent aliphatic or aromatic radical and inorganic sulphides and (b) a reinforcing filler. The composition provides a stable reinforced poly(aryl ether ketone) composition.

DETAILED DESCRIPTION OF THE INVENTION

Elemental sulfur, which has an atomic weight of 32.06, exists in two crystalline forms at room temperature and melting point of about 114° C. It is insoluble in water; soluble in carbon disulfide. The composition of the invention contains from about 0.1% to about 5% sulfur on a weight basis. A preferred concentration of sulfur in the invention is between 0.25% and 2%.

In the practice of this invention the sulfur may be dispersed in the poly(arylether ketone) in the form of a compound as described above. Of the dithiols, aromatic dithiols of the type HS—R—SH where R is a bivalent aromaic radical are preferred. Preferred aromatic dithiols are biphenyl-4,4'-dithiol, bis-(4-mercaptophenyl)ether and bis-(4-mercaptophenyl)sulphone 4,4' biphenyldithiol and 4-4'-dimercaptoether. Polydisulphides comprising repeat units having the formula —R—S—S— where R is a bivalent aliphatic and/or aromatic radical may also be used. A preferred inorganic sulphide is $MoS_2$. The weight of sulfur is calculated as the amount of sulfur present as elemental sulfur, sulphide which includes mercaptan and thiol, or disulphide.

The term poly(aryl ether ketone) refers to polymers having the repeat unit of the formula

—CO—AR—CO—Ar'— wherein Ar and Ar' are aromatic moieties at least one of which containing a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieities is used to mean aromatic moieties containing at least two aromatic rings. The rings can be fused, joined by a direct bond or by a linking group. Suck linking groups include for example, carbonyl, ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred:

Poly(aryl ether ketones) can be prepared by known methods of synthesis. Preferred poly(aryl ether ketones) can be prepared by Friedel-Crafts polymerization of a monomer system comprising:

(I)
(i) phosgene or an aromatic diacid dihalide together with
(ii) a polynuclear aromatic comonomer comprising:
  (a) H—Ar″—O—Ar″—H
  (b) H—(Ar″—O)$_n$—Ar″—H wherein n is 2 or 3
  (c) H—Ar″—O—Ar″—(CO—Ar″—O—Ar″-)$_m$—H wherein m is 1, 2 or 3
  or
  (d) H—(Ar″—O)$_n$—Ar″—CO—Ar″—(O—Ar″-)$_m$—H wherein m is 1, 2 or 3, and n is 2 or 3
or
(II) an acid halide of the formula: H—Ar″—O—[(Ar′-'—CO)$_p$—(Ar″—O)$_q$—(Ar″—CO)$_r$]$_k$—Ar′-'—CO—Z wherein Z is halogen, k is 0, 1 or 2, p is 1 or 2, q is 0, 1 or 2 and r is 0, 1 or 2;
or
(III) an acid halide of the formula: H—(Ar″—O)$_n$—Ar′-'—Y wherein n is 2 or 3 and Y is CO—Z or CO—Ar′-'—CO—Z where Z is halogen;

wherein each Ar″ is independently selected from substituted or unsubstituted phenylene, and substituted and unsubstituted polynuclear aromatic moieties free of ketone carbonyl or ether oxygen groups, in the presence of a reaction medium comprising:

(A) A Lewis acid in an amount of one equivalent per equivalent of carbonyl groups present, plus one equivalent per equivalent of Lewis base, plus an amount effective to act as a catalyst for the polymerization;
(B) a Lewis base in an amount from 0 to about 4 equivalents per equivalent of acid halide groups present in the monomer system; and
(C) a non-protic diluent in an amount from 0 to about 93% by weight, based on the weight of the total reaction mixture.

The aromatic diacid dihalide employed is preferably a dichloride or dibromide. Illustrative diacid dihalides which can be used include, for example wherein a is 0-4.

Illustrated polynuclear aromatic comonomers which can be used with such diacid halides are:

(a) H—Ar″—O—Ar″—H, which includes, for example:

(b) H—(Ar″—O)$_n$—Ar″—H, which include, for example:

and (c)   H—Ar''—O—Ar''—(CO—Ar''—O—Ar'')$_m$—H,
which includes, for example:

and

(d)   H—(Ar''—O)$_n$—Ar''—CO—Ar''—(O—Ar'')$_m$—H
which includes, for example:

Monomer systems II and III comprise an acid halide. (The term acid halide is used herein to refer to a monoacid monohalide.) In monomer system II, the acid halide is of the formula:

H—Ar''—O—[(Ar''—CO)$_p$—(Ar''—O)$_q$—(Ar'-'—CO)$_r$]$_k$—Ar''—CO—Z

Such monomers include for example, where k=0 and where k=1

In monomer system III, the acid halide is of the formula

H—(Ar''—O)$_n$—Ar''—Y

Examples of such acid halides include and

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long as one or more of the comonomers used contains at least one ether oxygen linkage. Such comonomers include for example:

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly can be used as a comonomer together with an ether-containing polynuclear aromatic acid halide or as an additional comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(aryl ether ketones) can be found in commonly assigned co-pending U.S. application Ser. No. 594,503, filed Mar. 31, 1984, the disclosure of which is incorporated herein by reference.

Additives may be included with the poly(aryl ether ketone) compositions of this invention. These additives include, for example, plasticizers and pigments, non-reinforcing fillers, thermal stabilizers; ultraviolet-light stabilizers, processing aids, impact modifiers, carbon black, and the like. The invention also relates to a reinforced composition comprising the composition and a reinforcing filler such as carbon or glass fibers or other polymeric fibers such as polyamides or reinforcing fillers such as graphite thus further increasing the strength of the composition. It is preferred that the reinforcing filler be present in an amount of from about 2% to about 30% by weight and the composition. Where fillers are used they may be blended into the poly(aryl ether ketone) composition at any convenient point in the operation.

The sulfur, in a concentration of from about 0.1% to about 5%, may be intimately dispersed in the poly(aryl ether ketone) by mixing or blending at a temperature of at least about the melting point of the poly(aryl ether ketone). For example, the sulfur may be mixed at the processing temperature using a mechanical mixing apparatus. A preferred method of mixing is by extrusion. A mixture blended at a temperature lower than the temperature may be heated to processing temperature, say e.g., by extrusion process, and then mixed further at such temperature.

The compositions of the invention have various uses. The composition can be formed into high-tensile-modulus fibers. Poly(aryl ether ketones) by themselves are difficult to use as high-temperature hot-melt adhesives because their viscosities are too high even at their melt temperatures. However, compositions of the invention can have lower viscosity before curing. Upon post curing at high temperature, crosslinking occurs within the material, and thereby improves the creep resistance at high temperatures. Hence, this modified material performs well as an adhesive at high temperatures. Another use for the compositions of the invention comprises the manufacture of molded or extruded articles which would show greater dimensional stability due to increased modulus and may be useful, for example, in well and mining applications where service life is critical.

The following examples serve to further describe and illustrate the practicing of the invention. Further, the examples demonstrate the improvements and desirably useful properties of the compositions described herein. One skilled in the art would readily be able to make substitutions of polymers or make adjustments in temperature, mixing conditions, etc. The examples are not intended in any way to limit the scope of the invention.

DESCRIPTION OF THE PREFERRED EMBODIMENTS

EXAMPLE 1

Procedure

The samples in examples 2–5 were all prepared and tested in a similar fashion. The poly(aryl ether ketone) for the adhesive was poly (carbonyl-p-phenylene-p-oxy-phenylene-p-oxy-phenylene) Formula IV (vitrex Peek from ICI Americas hereafter PEEK). Elemental sulfur was added to the said polymer in weight percentages of 0, 0.5, and 1.0 and extruded on a ZSK extruder. The pellets were then passed into slabs approximately 16 in$^2$ and 0.020–0.030 inches thick. A polyimide film (commercially available as Kapton film from DuPont) was used to prevent the polymer from sticking to the press plates. This pressing was done at 350° C., 10,000 lbs. ram foce, and for four minutes. After the hot pressing, the slab was put into a cold press for two minutes at 1000 lbs. ram force. The cold slabs were then cut into 1-inch by 1-inch pieces. In some instances the raw material was scraped with a razor blade and wiped with methanol. This was done to remove dirt, sand and Kapton that had accumulated on the adhesive surface.

Once the substrate either cold rolled steel or titanium as indicated below, and adhesive were cleaned, the two were bonded. The 1-inch by 1-inch adhesive slab was taped between two substrates with 1-inch aluminum tape. Thus the bonding area was one square inch. The samples, including tape, adhesive, and two substrates, were about about 0.130 inches thick. A pressing window of 0.120 inch was used to bond the sample. All pressings were done at 371° C. (700° F.), at pressures ranging from 250 psi to 5000 psi, and with bonding times varying from 3 minutes to 20 minutes. After the hot press, samples were immediately cold pressed at approximately 250 psi for four minutes. Once bonding was finished, the tape was removed and any adhesive present on the edges was removed with a razor blade.

Room-temperature lap-shear testing was done on a 10,000-lb. Instron. A crosshead speed of 2 inches per minute was used.

EXAMPLE 2

Control

| LAP-SHEAR STRENGTH OF PEEK* | | |
|---|---|---|
| Substrate** | Mean Lap-Shear Strength (psi) | No. of Samples |
| Cold-Rolled Steel | 810 | 4 |
| Cold-Rolled Steel | 910 | 5 |
| Cold-Rolled Steel | 790 | 4 |
| Cold-Rolled Steel | 980 | 4 |
| Cold-Rolled Steel | 760 | 4 |
| Titanium | 400 | 4 |
| Titanium | 200 | 6 |
| Overall Mean Strength | (psi) | |
| Steel Substrate, 21 Samples | 850 ± 150 | |
| Titanium Substrate, 10 Samples | 300 ± 110 | |

*Cleaning of substrate - Sanding, water rinse, acetone dip; polymer scraped, wiped with MeOH.
**Each entry represents an independent experiment.
Pressed - 10 minutes, 670 psi, 371° C.

EXAMPLE 3

| LAP-SHEAR STRENGTH OF PEEK + 0.5% S* | | |
|---|---|---|
| Substrate** | Mean Lap-Shear Strength (psi) | No. of Samples |
| Cold-Rolled Steel | 2030 | 4 |
| Cold-Rolled Steel | 2470 | 4 |
| Cold-Rolled Steel | 2300 | 3 |
| Cold-Rolled Steel | 2500 | 4 |
| Cold-Rolled Steel | 2340 | 2 |
| Titanium | 1430 | 5 |
| Overall Mean Strength | (psi) | |

-continued

| LAP-SHEAR STRENGTH OF PEEK + 0.5% S* | |
|---|---|
| Steel Substrate, 17 Samples | 2330 ± 240 |
| Titanium Substrate, 5 Samples | 1430 ± 60 |

*Cleaning of substrate - Standing, water rinse, acetone dip; polymer scraped, wiped with MeOH.
**Each entry represents an independent experiment.
Pressed - 10 minutes, 500-1000 psi, 371° C.

EXAMPLE 4

| LAP-SHEAR STRENGTH OF PEEK + 1% S* | | |
|---|---|---|
| Substrate** | Mean Lap-Shear Strength (psi) | No. of Samples |
| Cold-Rolled Steel | 2220 | 4 |
| Cold-Rolled Steel | 1980 | 2 |
| Cold-Rolled Steel | 1850 | 2 |
| Cold-Rolled Steel | 2430 | 3 |
| Cold-Rolled Steel | 1930 | 4 |
| Cold-Rolled Steel | 2070 | 3 |
| Cold-Rolled Steel | 2240 | 5 |
| Titanium | 1930 | 3 |

| Overall Mean Strength | (psi) |
|---|---|
| Steel Substrate, 23 Samples | 2140 ± 290 |
| Titanium Substrate, 3 Samples | 1930 ± 150 |

*Cleaning of substrate - Sanding, water rinse, acetone dip; polymer scraped, wiped with MeOH.
**Each entry represents an independent experiment.
Pressed - 10 minutes, 670 psi, 371° C.

EXAMPLE 5

| LAP-SHEAR STRENGTH OF ANNEALED SAMPLES* | | | |
|---|---|---|---|
| Set | Substrate** | Mean Lap-Shear Strength (psi) | No. of Samples |
| M | PEEK — Steel | 1390 | 4 |
| BB | PEEK — Steel | 1410 | 5 |
| X | PEEK + 1% S — Steel | 2540 | 5 |
| BB | PEEK + 1% S — Steel | 2460 | 6 |
| AD | PEEK + 1% S — Steel | 2540 | 4 |
| BL | PEEK + 1% S — Steel | 2540 | 4 |

| Overall Mean Strength | (psi) |
|---|---|
| PEEK — Steel, 9 Samples | 1400 |
| PEEK + 1% S — Steel, 19 Samples | 2510 |

*Cleaning of substrate - Standing, water rinse, acetone dip; polymer scraped, wiped with MeOH.
**Each entry represents an independent experiment.
Pressed - 10 minutes, 600-1000 psi, 371° C.
Annealed - 210° C./18 hours

EXAMPLE 6

Procedures

Polymers of Formula I or IV (PEEK) as pellets were mixed with elemental Sulfur in a plastic container. The polymer pellets were usually dried at 150° C. for 4 hours before they were processed. The sulfur-concentration ranges of 0.25-2% by weight were used. In addition, two dithiols (4-4' biphenylidithiol and 4-4' dimercaptoether) and one inorganic sulphide (MoS$_2$) were used in the formulations. The mixtures of Formula I or Formula IV with each of sulfur, dithiol, and sulphide were compounded using either the ZSK or ZSE extruder. H$_2$S was evolved during the mixing process.

It should be noticed that attachment of a vacuum outlet at the exit of the die would help to eliminate gases, such as H$_2$S formed during processing. Thus, it reduces the porosity of the pellets. The resulting ZSK- or ZSE-compounded pellets were used in injection-molding of tensile bars (T-bar) and in extrusion of taps and fibers.

Stress-Strain Tests

Stress-stain tests were performed on an Instron. The tests were chosen to run at room temperature and 200° C. The jaw-separation speed was chosen to be 2"/min and 0.5"/min at room temperature and 200° C., respectively. The high test temperature was chosen to be 200° C. because it is higher than the Tg of both Formula I and PEEK (Tg=145° C. and 165° C. for PEEK and Formula I respectively). All the samples were annealed for 4 hours at 240° C.

Figure 1:
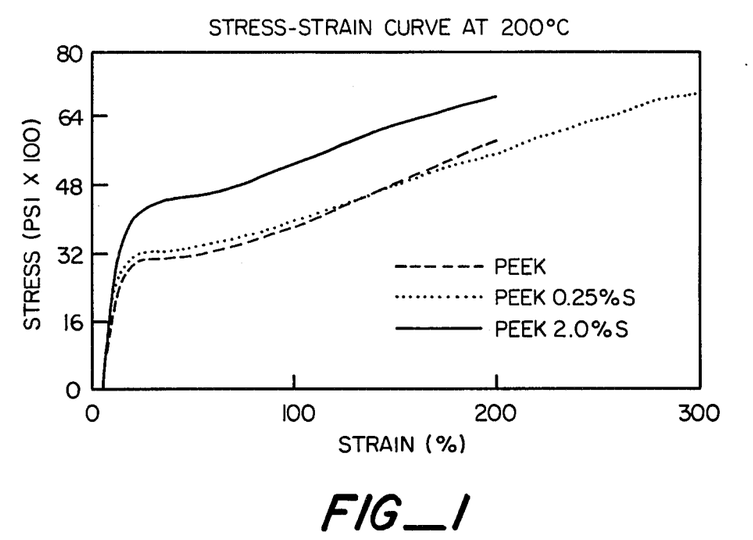
FIG. 1 is a stress strain curve at 200° C. for annealed samples of poly(aryl ether ketone) both with and without sulfur.

FIG. 1 shows stress-strain curves measured at 200° C. for a set of injection-molded T-bars for PEEK. Tables 1 and 2 summarize all tensile-elongation properties measured at room temperature and 200° C., respectively, for this set of samples. Two interesting features can be observed directly in Table 2: an increase of Young's modulus as well as elongation-at-break is observed as a function of the sulfur concentration and the addition of the dithiols produces similar effects as elemental sulfur does. The room-temperature data agree with what we generally observe for materials that are crosslinked—a decrease in elongation-at-break and no significant increase in tensile modulus at temperature below Tg. However, the 200° C. data show a maximum increase of 50% both in the Young's modulus and elongation-at-break at sulfur concentration of 1%.

EXAMPLE 7

(ii) Stress-relaxation and creep measurements

Creep and stress-relaxation are two important tests, which measure the dimensional stability of a material. Stress-relaxation, which is the counterpart of creep, can be easily performed on an Instron. The sample is subjected to a constant strain (5% strain was used) and the decay of stress as a function of time is observed. In a creep experiment, a constant force is applied to the sample by a weight and the strain as a function of time is measured by means of a transducer. To observe the effects both stress-relaxation and creep experiments were performed at 200° C., which is above the Tg of both PEEK and the polymer of Formula I. The samples were annealed at 240° C. for 4 hours before experiments.

Figure 2:
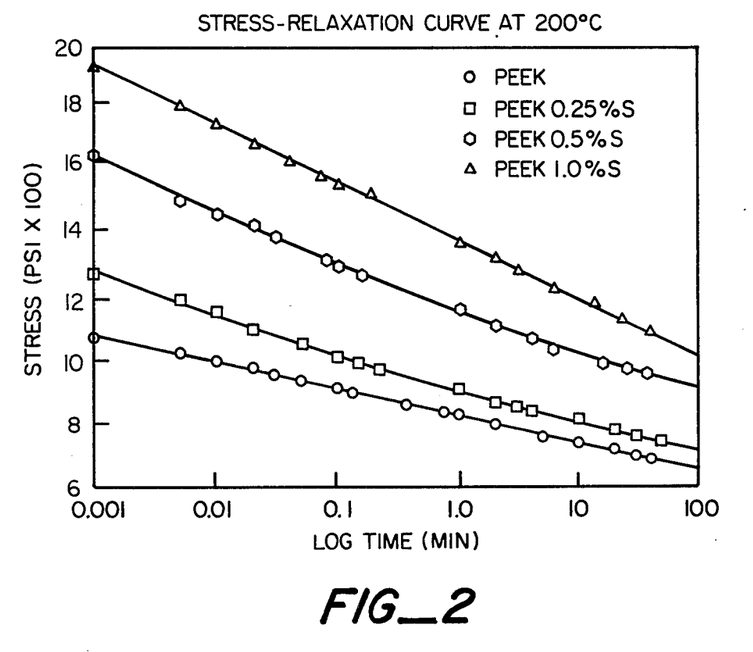
FIG. 2 is a stress versus time graph for annealed samples of a poly(aryl ether ketone) both with and without sulfur.
Figure 3:
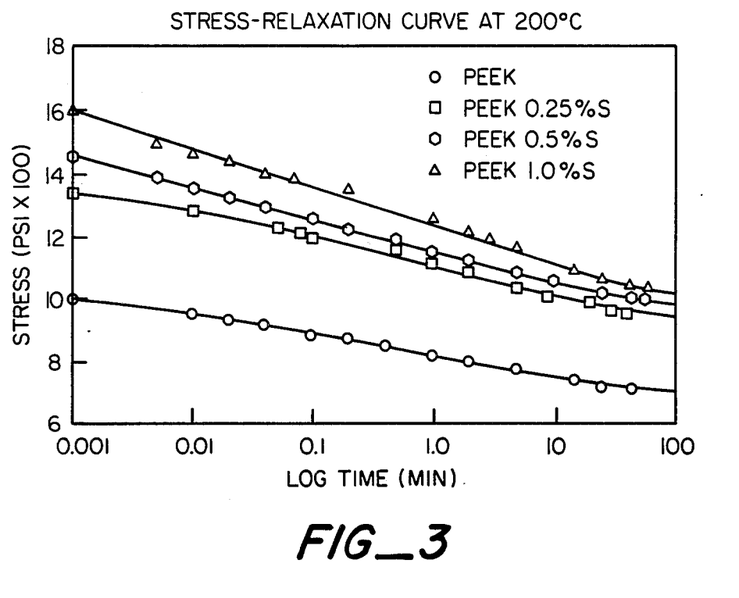
FIGS. 3 and 4 are stress relaxation curves for annealed samples.
Figure 4:
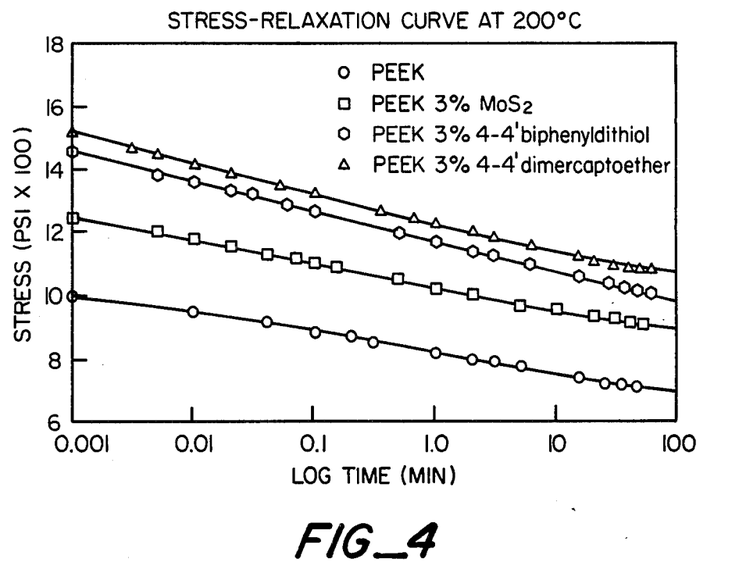

FIG. 2 shows a set of stress-relaxation curves at 200° C. for four samples: curve (A)—Formula I, curve (B)—Formula I+0.25% S, curve (C)—Formula I+0.5% S and Curve (D)—Formula I+1% S. Curves (A-C) appear to have a very similar relaxation time since their gradients are very similar. However, the initial and final stresses of the Formula I+1% S are approximately 100% higher than those of the control sample. This means that the Formula I+1% S material is a much better material for making high-temperature structural parts because under a constant stress, it would have a much less deformation (elongation). Similar results, but less dramatic, are observed for the Formula I samples with lower sulfur concentrations as shown in FIG. 2. FIGS. 3 and 4 show similar curves for PEEK samples. Sulfur has similar effects on PEEK as it has on Formula I. The two dithiols and MoS$_2$ also improve PEEK's performance in the stress-relaxation experiment.

Figure 5:
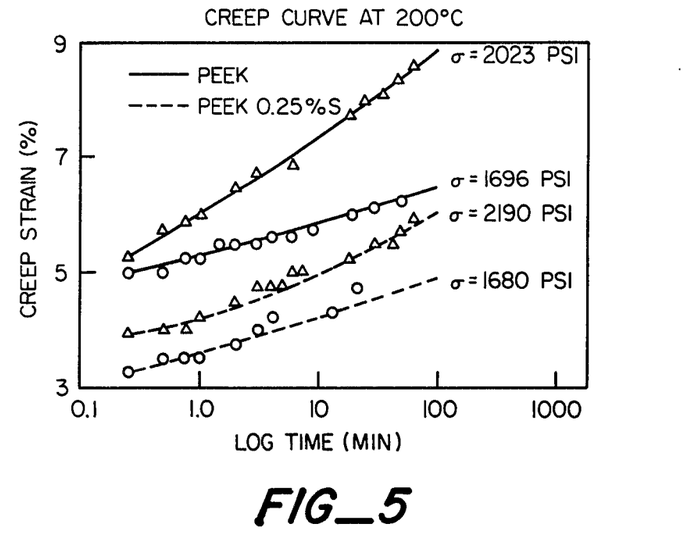
FIGS. 5 and 6 are graphs showing creep strain % verses time at 200° C. for poly(aryl ether ketone) with and without sulfur.
Figure 6:
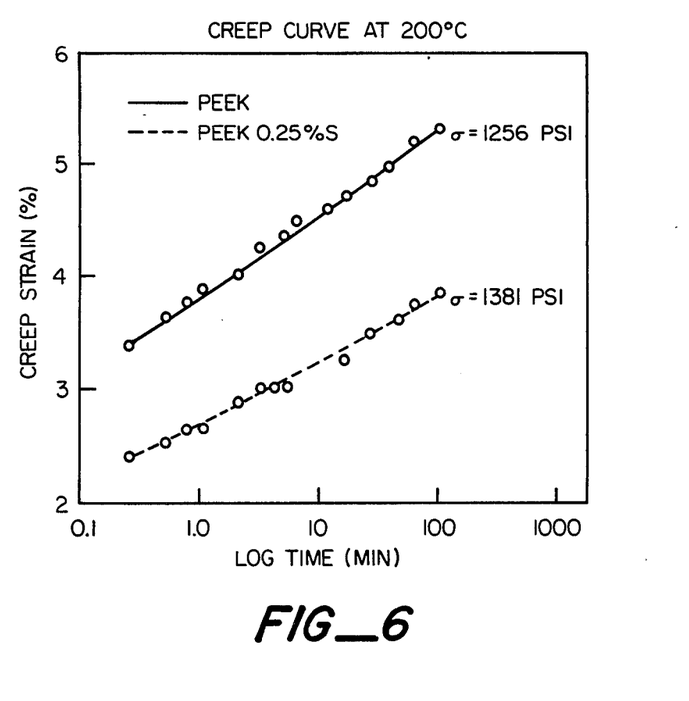

Creep data, which are more useful to engineers than stress-relaxation data are shown in FIGS. 5 and 6. The samples used in this experiment were extruded taps of PEEK and PEEK+0.25%S. In FIG. 5 the two samples were kept under a constant stress approximately equal to 1300 psi. The initial strain (t=0) and final strain (t=100 min) of the PEEK+0.25% S sample are much less than those of the control sample. A similar trend is observed in FIG. 6 for the test performed at different stresses. In addition, at high stress ($\sigma$=2100 psi), the control sample appears to have a higher creep rate than sulfur-modified sample. The creep results are in good agreement with the stress-relaxation data.

EXAMPLE 8

Mechanical Properties of sulfur-modified PEEK fibers

Two sets of fibers (100% PEEK and 99.5% Victrex PEEK and 0.5% sulfur) were extrdued. The extruded fibers were aged at 260° and 300° C. for various lengths of time. The room-temperature and 200-° C. mechanical properties of these fibers were measured. The results were summarized in Tables 3–6. The 200-° C. Young's modulus of the extruded sulfur-modified PEEK fibers is about twice that of the control fibers. It is known that the Young's modulus of Victrex PEEK and Formula I will increase upon annealing at high temperature in air. The results shown in Tables 3–6 do show an increase of the Young's modulus as a function of aging time. However, the 200° C. Young's modulus of the sulfur-modified Victrex PEEK fibers is close to a factor of two higher than that of control counterparts at various lengths of aging time. These results indicate positively that sulfur can increase the high-temperature mechanical properties of Victrex PEEK or Formula I beyond what can be achieved by annealing the polymers at high temperatures in air.

TABLE 1

| sample | mechanical properties of peek at R.T. | | |
|---|---|---|---|
| | E (psi × 100) | $\sigma_b$ (psi × 1000) | $\epsilon_b$ (%) |
| 1 | 185 | 13.8 | 40 |
| 2 | 211 | 14.2 | 23 |
| 3 | 204 | 13.5 | 28 |
| 4 | 212 | 14.8 | 25 |
| 5 | 188 | 15.1 | 17 |
| 6 | 216 | 13.5 | 10 |
| 7 | 198 | 13.7 | 13 |
| 8 | 201 | 14.5 | 28 |
| 9 | 208 | 14.5 | 25 |

1 peek
2 peek 0.25% S
3 peek 0.25% S
4 peek 0.5% S
5 peek 1.0% S
6 peek 3% 4-4 biphenyl dithiol
7 peek 3% 4-4 dimercaptoether
8 peek 3% MoS
9 peek 3% MoS 0.25% S
sample annealed at 240 C. for 4 hr.
(zse): injection-molded T-bar

TABLE 2

| sample | mechanical properties of peek at 200 C. | | |
|---|---|---|---|
| | E (psi × 100) | $\sigma_b$ (psi × 1000) | $\epsilon_b$ (%) |
| 1 | 22.1 | 5.6 | 160 |
| 2 | 27.8 | 6.3 | 198 |
| 3 | 30.3 | 6.2 | 220 |
| 4 | 34.0 | 6.1 | 240 |
| 5 | 30.4 | 6.5 | 247 |
| 6 | 31.4 | 6.2 | 262 |
| 7 | 25.9 | 6.4 | 210 |

1 peek
2 peek 0.25% S
3 peek 0.5% S
4 peek 1.0% S
5 peek 3% 4-4' biphenyldithiol
6 peek 3% 4-4' dimercaptoether
7 peek 3% MoS
(zse): injection-mold T-bar
sample annealed at 240 C. for 4 hr.

TABLE 3

Room-temperature mechanical properties of the control and sulfur-modified Victrex PEEK fibers aged at 260° C.

| Samples | Aging time (days) | | | | | | | | |
|---|---|---|---|---|---|---|---|---|---|
| | 0 | 1 | 2 | 5 | 8 | 14 | 22 | 30 | 40 |
| Young's modulus × 1000 psi | | | | | | | | | |
| control | 240 | 325 | 318 | 271 | 261 | 422 | 386 | 353 | 377 |
| 0.5%-S | 219 | 328 | 402 | 414 | 396 | 439 | 460 | 470 | 473 |
| Tensile strength × 1000 psi | | | | | | | | | |
| control | 20 | 23 | 24 | 24 | 24 | 23 | 22 | 22 | 22 |
| 0.5%-S | 20 | 24 | 28 | 28 | 27 | 27 | 26 | 27 | 28 |
| Elongation (%) | | | | | | | | | |
| control | 160 | 110 | 105 | 108 | 107 | 110 | 102 | 90 | 90 |
| 0.5%-S | 140 | 43 | 60 | 55 | 53 | 70 | 53 | 40 | 37 |

TABLE 4

200° C. mechanical properties of the control and sulfur-modified Victrex PEEK fibers aged at 260° C.

| Samples | Aging time (days) | | | | | | | | |
|---|---|---|---|---|---|---|---|---|---|
| | 0 | 1 | 2 | 5 | 8 | 14 | 22 | 30 | 40 |
| Young's modulus × 1000 psi | | | | | | | | | |
| control | 13 | 39 | 42 | 42 | 42 | 36 | 50 | 51 | 52 |
| 0.5%-S | 25 | 60 | 70 | 66 | 69 | 71 | 82 | 84 | 99 |
| Tensile strength × 1000 psi | | | | | | | | | |
| control | 9 | 10 | 10 | 10 | 10 | 10 | 12 | 14 | 15 |
| 0.5%-S | 10 | 10 | 12 | 12 | 11 | 14 | 13 | 12 | 13 |
| Elongation (%) | | | | | | | | | |
| control | 181 | 137 | 140 | 147 | 133 | 165 | 178 | 192 | 183 |
| 0.5%-S | 155 | 97 | 123 | 103 | 90 | 128 | 100 | 83 | 80 |

TABLE 5

Room-temperature mechanical properties of the control and sulfur-modified fibers aged at 300° C.

| Samples | Aging time (days) | | | | | | | | |
|---|---|---|---|---|---|---|---|---|---|
| | 0 | 1 | 2 | 5 | 8 | 14 | 22 | 30 | 40 |
| Young's modulus × 1000 psi | | | | | | | | | |
| control | 240 | 292 | 308 | 280 | 418 | 397 | 374 | 394 | 352 |
| 0.5%-S | 219 | 403 | 382 | 387 | 587 | 438 | 435 | 378 | 414 |
| Tensile strength × 1000 psi | | | | | | | | | |
| control | 20 | 24 | 21 | 22 | 24 | 22 | 21 | 22 | 20 |
| 0.5%-S | 20 | 28 | 29 | 29 | 28 | 23 | 23 | 23 | 21 |
| Elongation (%) | | | | | | | | | |
| control | 160 | 107 | 88 | 60 | 50 | 33 | 20 | 12 | 12 |
| 0.5%-S | 140 | 60 | 58 | 43 | 28 | 19 | 12 | 9 | 6 |

TABLE 6

200° C. mechanical properties of the control and sulfur modified Victrex PEEK fibers aged at 300° C.

| Samples | Aging time (days) | | | | | | | | |
|---|---|---|---|---|---|---|---|---|---|
| | 0 | 1 | 2 | 5 | 8 | 14 | 22 | 30 | 40 |
| Young's modulus × 1000 psi | | | | | | | | | |
| control | 13 | 39 | 40 | 45 | 53 | 87 | 187 | 170 | 167 |
| 0.5%-S | 25 | 60 | 58 | 81 | 122 | 170 | 298 | 270 | 251 |
| Tensile strength × 1000 psi | | | | | | | | | |
| control | 9 | 10 | 12 | 11 | 12 | 14 | 12 | 13 | 10 |

TABLE 6-continued

200° C. mechanical properties of the control and sulfur modified Victrex PEEK fibers aged at 300° C.

| Sam-ples | Aging time (days) | | | | | | | |
|---|---|---|---|---|---|---|---|---|
| | 0 | 1 | 2 | 5 | 8 | 14 | 22 | 30 | 40 |
| 0.5%-S | 10 | 13 | 14 | 14 | 15 | 14 | 13 | 13 | 13 |
| Elongation (%) | | | | | | | | | |
| control | 181 | 130 | 132 | 95 | 63 | 38 | 16 | 10 | 3 |
| 0.5%-S | 150 | 80 | 68 | 32 | 27 | 23 | 10 | 9 | 5 |

What is claimed is:

1. A composition comprising a poly(aryl ether ketone) having intimately dispersed therein from about 0.1% to about 5% sulfur, by weight, based on the weight of the poly(aryl ether ketone), the sulfur present as at least one member of the class consisting of elemental sulfur, aliphatic and aromatic dithiols, polymeric oxidation products thereof comprising repeat units of the formula —R—S—S— where R is a bivalent aliphatic or aromatic radical and inorganic sulphides.

2. A composition according to claim 1 comprising from about 0.25% to 5% sulfur.

3. A composition according to claim 1 which further comprises a reinforcing filler.

4. A composition according to claim 3 wherein the reinforcing filler is present in amounts of from about 2% to 30% by weight.

5. A composition according to claim 1 wherein the poly (aryl ether ketone) is of the formula:

6. A composition according to claim 1 wherein the poly(aryl ether ketone) is of the formula:

7. A composition according to claim 1 wherein the poly(aryl ether ketone) is of the formula:

8. A composition according to claim 1 wherein the poly(aryl ether ketone) is of the formula:

9. A composition according to claim 1 wherein the poly(aryl ether ketone) is of the formula:

10. A composition according to claim 3 wherein the reinforcing filler comprises (a) glass fibers; (b) carbon fibers; (c) polymeric fibers; or (d) graphite.

11. A shaped article comprising a composition comprising a poly(aryl ether ketone) having intimately dispersed therein from about 0.1% to about 5% sulfur, by weight, based on the weight of the poly(aryl ether ketone), the sulfur present as at least one member of the class consisting of elemental sulfur, aliphatic and aromatic dithiols, polymeric oxidation products thereof comprising repeat units of the formula —R—S—S— where R is a bivalent aliphatic or aromatic radical an inorganic sulphides.

12. A shaped article according to claim 11 wherein the article is a fiber.

13. An article according to claim 12 wherein the article contains a reinforcing filler.

14. An article according to claim 13 wherein the reinforcing filler comprises (a) glass fibers; (b) carbon fibers; (c) polymeric fibers; or (d) graphite.

* * * * *